June 18, 1957  F. E. OLDERR  2,796,020
STANDARD LOAF PAN INSERT
Filed May 11, 1956  2 Sheets-Sheet 1
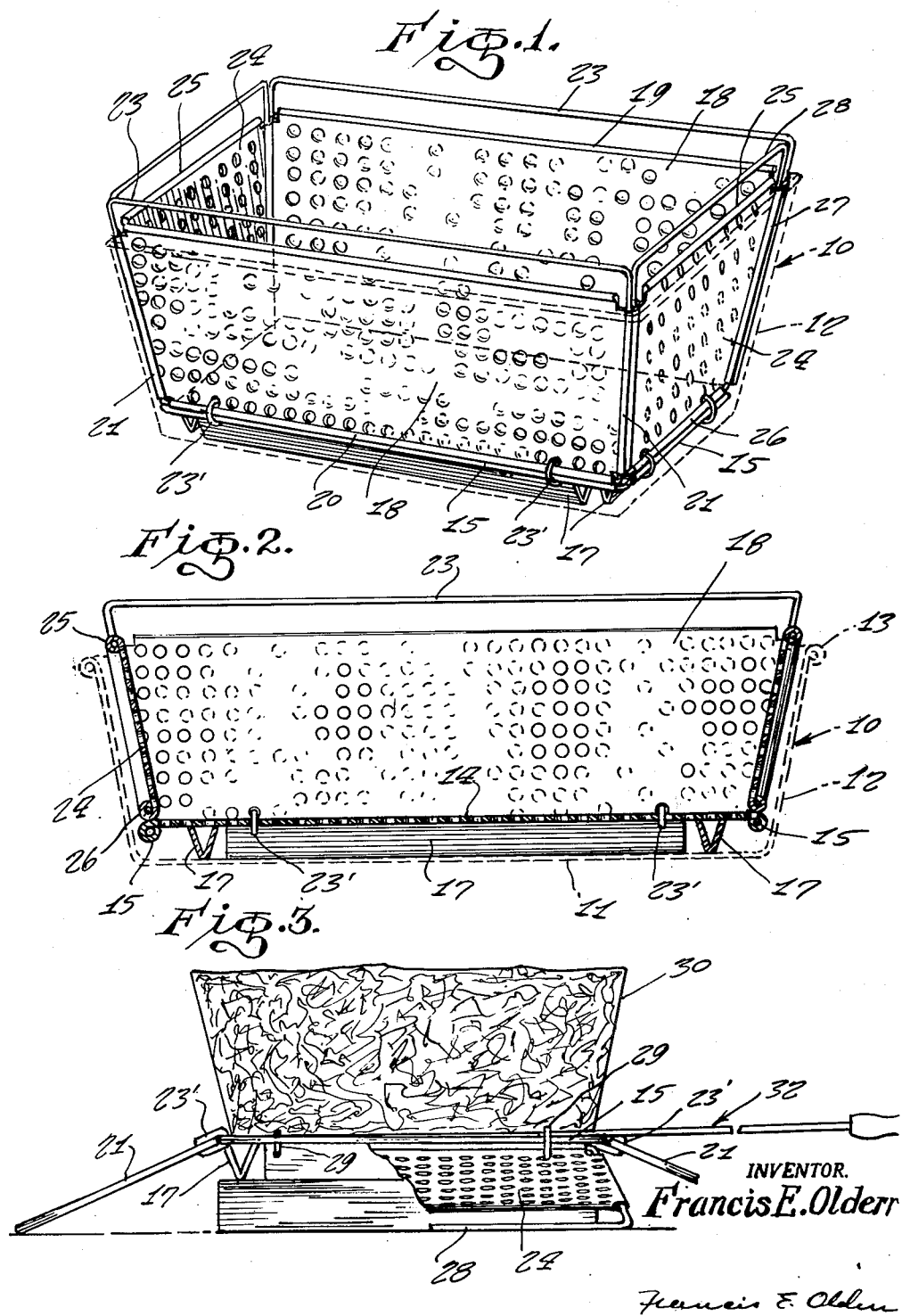
INVENTOR.
Francis E. Olderr June 18, 1957 F. E. OLDERR 2,796,020
STANDARD LOAF PAN INSERT Filed May 11, 1956 2 Sheets-Sheet 2

INVENTOR
*Francis E. Olderr*

2,796,020
Patented June 18, 1957

2,796,020

STANDARD LOAF PAN INSERT

Francis E. Olderr, Franklin Park, Ill.

Application May 11, 1956, Serial No. 584,378

4 Claims. (Cl. 99—436)

This invention relates to devices for facilitating the removal of baking products from the baking pan after the baking process has been completed.

It is an object of the present invention to provide an insert for standard loaf baking pans which may be easily and readily removed from the standard loaf pan after the baking process has been completed and wherein the loaf may be easily and readily removed from the insert to permit the user to successfully bake a loaf without the usual and attendant sticking of the product to the pan.

It is another object of the present invention to provide a standard loaf pan insert of the above type wherein the sides and ends of the insert automatically fall away from the loaf as the insert is removed from the standard loaf pan and wherein complete removal of the loaf from the insert is accomplished by merely sliding a spatula or the like under the loaf.

It is still another object of the present invention to provide a standard loaf pan insert of the above type wherein the bottom wall of the insert is supported in freely spaced relationship to the bottom wall of the standard loaf pan to provide a reservoir adapted to contain water or the like which will evaporate as the grease and drippings from the loaf drop down into this reservoir to prevent the burning and sticking to the pan proper, so common in conventional loaf pans, and to provide a reservoir or residue of delicious gravy.

Other objects of the invention are to provide a standard loaf pan insert bearing the above objects in mind which is of simple construction, has a minimum number of parts, is inexpensive to manufacture and is efficient in use.

For other objects and for a better understanding of the invention, reference may be had to the following detailed description taken in connection with the accompanying drawing, in which:

Figure 1 is a perspective view of a preferred embodiment of the present invention shown in operative position and illustrating in phantom the standard loaf pan;

Fig. 2 is a longitudinal vertical sectional view thereof;

Fig. 3 is an end elevational view showing the insert removed from the standard loaf pan and positioned on the cutting board, and showing the removal of the loaf from the insert with a spatula or the like after the side and end walls have collapsed downwardly away from the loaf;

Figure 4:
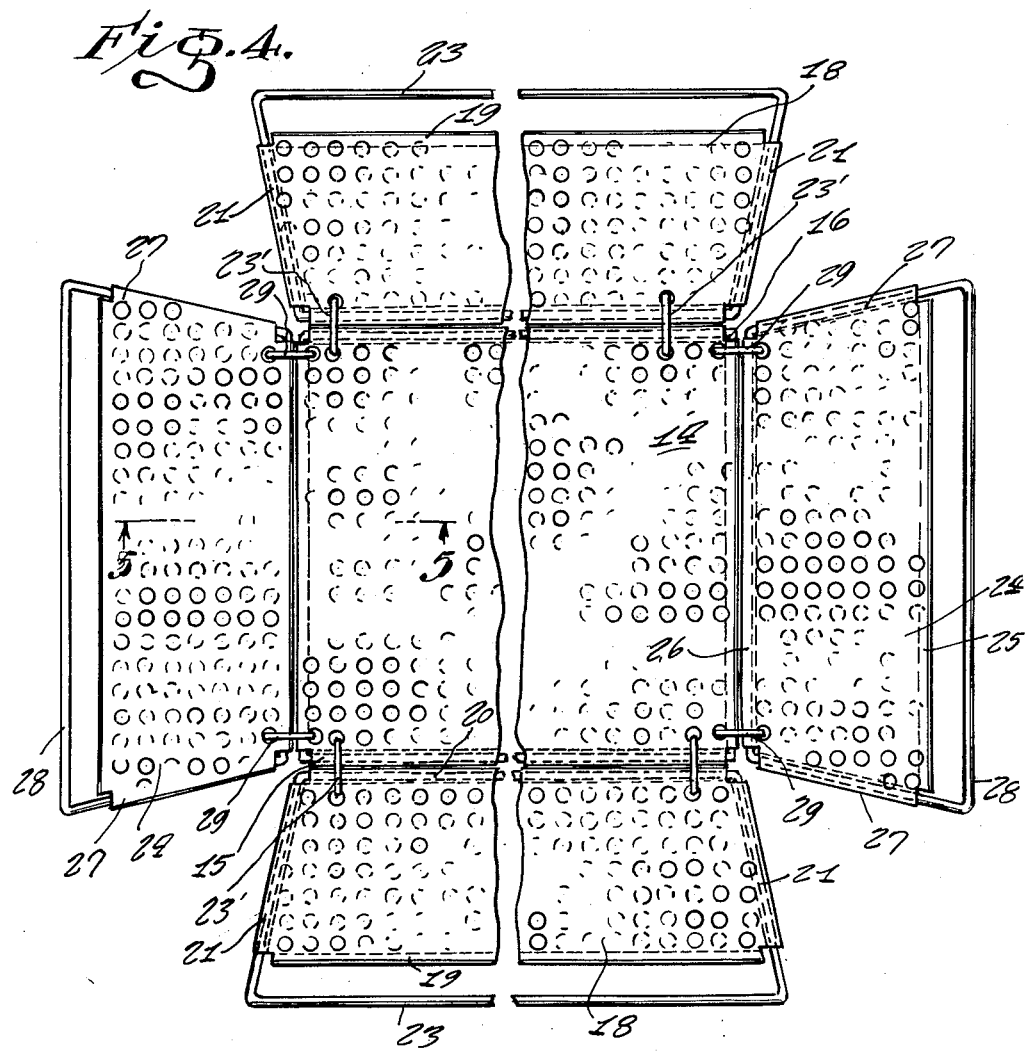
Fig. 4 is a top plan view of the invention showing the side and end walls in the collapsed position.
Figure 5:
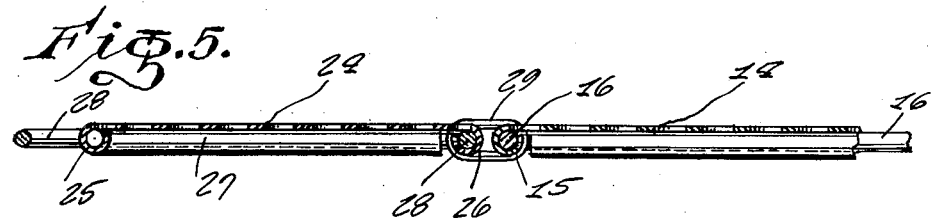
Fig. 5 is a vertical sectional view taken along the line 5—5 of Fig. 4.

Referring now more in detail to the drawing, 10 indicates generally a standard loaf baking pan having the bottom wall 11, the side walls 12 and the rolled upper edge 13, substantially as illustrated. Such pans are normally employed for baking meat loaf and other products and suffer from the disadvantage in that the loaf is difficult to remove from the pan after baking and then invariably part of the crust is burned to the pan, making it difficult to clean.

In the practice of my invention, means are provided to facilitate the removal of the loaf from the pan after baking and include the rectangular perforated bottom wall 14, having the downwardly rolled peripheral edge 15 on four sides thereof. For strengthening purposes a rod 16 extends around the periphery of the bottom wall 14 within the rolled edges 15 thereof (Fig. 4). The bottom wall 14 is supported above the bottom wall 11 of the standard loaf pan in freely spaced relationship thereto by means of the four legs 17 of substantially V-shaped cross section, the legs 17 being suitably welded or otherwise secured to the bottom wall 14.

A pair of perforated, substantially trapezoidal shaped side walls 18 are provided having upper and lower rolled edges 19 and 20. The end edges of the side walls 18 are also rolled, as at 21 and receive downwardly therewithin the end portions of the U-shaped strengthening rod 23, the central portion of the rod 23 being vertically spaced above the rolled edge 19. The lower edges of the side walls 18 are pivotally connected to the longitudinal edges of the bottom wall 14 by means of the wire loops 23' which surround the adjacent rolled edges 20 and 15, as will be obvious. Of course, any other suitable means may be provided for pivotally connecting the side walls to the bottom wall, as will be apparent to those skilled in the art. For further strengthening purposes, the lower portions of the strengthening rods 23 may be connected by a fourth side, this side passing through the rolled edges 20.

A pair of perforated, substantially trapezoidal shaped end walls 24 are provided, having the upper and lower rolled edges 25 and 26, respectively. The end edges of the side walls 24 are also rolled as at 27. A substantially trapezoidal shaped strengthening rod 28 is positioned within the rolled edges 27 and 26, the upper portion thereof being freely spaced from the rolled edge 25.

The lower edges of the end walls 24 are pivotally connected to the ends of the bottom wall 14 by means of the wire loops 29.

Thus, when the insert is placed within the standard loaf pan 10, as shown in Fig. 1, the side walls and end walls of the insert will come together and be supported by the side wall 12 of the standard loaf pan, the upper central portions of the strengthening rods 23 and 28 extending above the top of the loaf pan. The meat loaf 30 to be baked is then placed within the insert and baked in the usual manner. Upon removal of the loaf pan, insert and loaf of the oven, the insert and loaf may then be removed from the standard loaf pan and in so doing the end and side walls of the insert will automatically fall away from the loaf. The insert and loaf are then placed on the cutting board 31 or other supporting surface and the loaf 30 is removed from the bottom wall 14 by means of the spatula, indicated generally at 32 and placed on the serving tray or meat platter.

The legs 17, as shown, may be replaced by V-shaped legs or supports which are raised or welded to the bottom wall 14 on the longitudinal dimension. These legs or rests may also be formed as an integral part of the bottom frame to eliminate the welding operation. The loops 23' and 29 may also be replaced by straight wires having loops at the upper and lower ends thereof which respectively receive the lower edges of the end and side walls and the rolled edges of the bottom wall.

It will be noted that there is a compartment intermediate the bottom wall 14 of the insert and the bottom wall 11 of the standard loaf pan 10 which will catch and retain any and all juices and/or fat that comes from the loaf during the baking process, the juices and fat reaching the bottom of the pan by virtue of the perforations in the bottom wall 14 as well as in the sides and ends thereof. A cup of water is also placed in this compartment at the start of the baking process, and as the process continues, the water is heated and begins to evaporate. As the water evaporates, it is in turn replaced by the meat drippings and they are in turn prevented from burning and sticking to the pan proper by virtue of the water bath thus provided. This residue then becomes the start for a very delicious gravy requiring only the removal of excess fat and the usual method of thickening.

The pan is then cleaned as any other dish as there is no sticking of any kind and scraping and soaking is thus eliminated. The insert is also washed in a similar manner.

It should now be apparent that there has been provided a standard loaf pan insert which will permit anyone who desires to bake a meat loaf, using their own recipe or any recipe that has been obtained, with no previous experience, to be able to turn out or bake a perfect meat loaf without sticking or burning of the product on the pan. There are also no losses of juices in attempting to turn or baste the loaf, burns are practically eliminated, as turning of the loaf in the pan is not required. The standard loaf pan insert is, of course, not limited to meat loaf, as it may also be used to bake other food products as plum puddings and the like. The insert may also be used to heat leftovers, such as fried chicken, chops, roasts, etc. by the addition of a small amount of water in the bottom of the pan.

While various changes may be made in the detail construction, it shall be understood that such changes shall be within the spirit and scope of the present invention as defined by the appended claims.

What I claim as new and desire to protect by Letters Patent of the United States is:

1. An insert for baking pans comprising a bottom wall adapted to fit within the baking pan integrally formed with rolled edges on the four sides thereof and being perforated over substantially its entire surface, means for supporting said bottom wall in vertically spaced relationship to the bottom wall of the baking pan, perforated side wall means comprising a pair of substantially trapezoidal perforated plates having their smaller bases disposed downwardly and of substantially the same length as the longitudinal sides of said bottom wall, means pivotally connecting said perforated side wall means to the opposite longitudinal edges of said bottom wall comprising a plurality of longitudinally spaced wire loops passed around the adjacent rolled edges of said side walls and bottom wall and through the perforations therein, perforated end wall means and means for pivotally connecting said perforated end wall means to the opposite ends of said bottom wall, said end wall means comprising a pair of substantially trapezoidal shaped perforated plates having perforations over substantially their entire area, at least the lower edges of said end plates being rolled, said means pivotally connecting said end walls to said bottom wall comprising a plurality of laterally spaced wire loops surrounding the adjacent rolled edges and passing through the perforations in said end and bottom walls, said side and end wall means being retained in an upright position by the side and ends of the baking pan and being adapted to rotate about said wire loops toward a collapsed position as the insert and loaf thereon is removed from the baking pan, whereby adhering and burning of the loaf to the baking pan is avoided.

2. An insert according to claim 1, said end and side walls at their opposite ends having rolled edges adapted to abut each other when in the operative position, a first pair of substantially trapezoidal strengthening rods positioned within the bottom and end rolled edges of said side walls at the top portion of said rods vertically spaced above the top edges thereof and the top of the baking pan to facilitate removal of the insert with the loaf thereon, and a second pair of substantially trapezoidal shaped strengthening rods positioned within the end and bottom rolled edges of said end walls with the upper portions thereof vertically spaced above the upper edges of said end walls and the upper edges of the baking pan.

3. An insert according to claim 2, said supporting means comprising a pair of laterally spaced, longitudinally extending legs of V-shaped cross section having their apexes disposed on the bottom of the baking pan, and a second pair of longitudinally spaced, laterally extending legs of V-shaped cross section having their apexes in contact with the bottom wall of the baking pan and means for securing said legs to the undersurface of said bottom wall.

4. An insert according to claim 2, said supporting means comprising four substantially V-shaped rods, a pair of said rods being positioned at opposite ends of said bottom wall on the undersurface thereof and in laterally spaced relationship whereby to support said bottom wall at each corner, the plane of said legs being disposed longitudinally of said bottom wall.

References Cited in the file of this patent

UNITED STATES PATENTS

| | | |
|---|---|---|
| 424,370 | Stasch | Mar. 25, 1890 |
| 1,443,901 | Murray | Jan. 30, 1923 |